United States Patent [19]
Bechu

[11] Patent Number: 4,993,756
[45] Date of Patent: Feb. 19, 1991

[54] CONNECTING DEVICE

[75] Inventor: Jean-Pierre Bechu, Courbevoie, France

[73] Assignee: Caoutchouc Manufacture et Plastiques S.A., Versailles, France

[21] Appl. No.: 438,086

[22] Filed: Nov. 16, 1989

[30] Foreign Application Priority Data

Nov. 17, 1988 [FR] France ................. 88 14946

[51] Int. Cl.⁵ .............................................. F16L 39/00
[52] U.S. Cl. ................................... 285/319; 285/242;
285/344; 285/376; 285/381; 285/921; 285/906;
285/24; 285/404
[58] Field of Search ............. 285/344, 319, 242, 921,
285/906, 376, 381, 404, 24

[56] References Cited

U.S. PATENT DOCUMENTS

| 543,871 | 8/1895 | Houze | 285/344 X |
| 1,502,673 | 7/1924 | Hole | 285/344 X |
| 2,094,629 | 10/1937 | Whittam | 285/344 X |
| 2,264,815 | 12/1941 | Thomson | 285/344 X |
| 3,917,325 | 11/1975 | Mengeringhausen | 285/344 |

FOREIGN PATENT DOCUMENTS

| 109891 | 6/1928 | Austria | 285/344 |
| 210687 | 8/1960 | Fed. Rep. of Germany | 285/344 |
| 1187434 | 2/1965 | Fed. Rep. of Germany | 285/344 |
| 401302 | 7/1909 | France | 285/344 |
| 2313583 | 6/1975 | France . | |
| 2313584 | 6/1975 | France . | |
| 2487927 | 8/1980 | France . | |
| 2496831 | 12/1980 | France . | |
| 2596133 | 3/1986 | France . | |
| 1365477 | 9/1974 | United Kingdom | 285/344 |
| 8700905 | 2/1987 | World Int. Prop. O. . | |

Primary Examiner—Dave W. Arola
Attorney, Agent, or Firm—Nils H. Ljungman & Associates

[57] ABSTRACT

Fitted coupling device, formed by two components, for connection to a flexible tube, having a female component and a male component on which said flexible tube is attached by thermal contraction of an external ring. The coupling device has an elastomer O-ring which is gradually compressed between two facing surfaces, one of which is essentially cylindrical and the other of which is a small-angle cone. The compression takes place during an axial manoeuver causing the rolling without sliding of said O-ring, which executes one or more complete turns on itself.

16 Claims, 4 Drawing Sheets

FIG_1a

FIG_1b

FIG_2a

FIG_2b

FIG_3

FIG_4

CONNECTING DEVICE

BACKGROUND OF THE INVENTION

1. Field of the Invention

The present invention is directed to providing a sealable connecting device for coupling one component onto a rigid tubular terminal portion of another component and, more specifically, to such a connecting device in which the components to be coupled are of the male-female type.

2. Description of the Prior Art

It is not uncommon, in various machines, devices, or systems, to employ flexible tubes, which are formed of thermoplastic or elastomer materials which are sometimes reinforced with textile reinforcements. The increasing use of such flexible tubes have given rise to a large number of quick-connection systems, which may be detachable or semi-reusable. Two major categories of such systems can be found in the prior art.

The first category includes a generally symmetrical system, in which a gasket is axially compressed by two components which may, for example, be locked together by a rotating bayonet device. The most common examples of such systems include hoses for fire trucks and compressed air feed lines used in industry and in public works. In such connecting or coupling devices, the sealed joint may or may not be subjected to slight deformations in a direction perpendicular to the principal direction of compression during the locking process.

On the other hand, another category of connecting or coupling devices employ male-female elements, which are, in most cases, two cylindrical or essentially cylindrical elements for being disposed on the same axis during the coupling. The axial movement required during the coupling is linear and, with few exceptions, the preferred seal between the male-female element includes a round gasket, an O-ring, or a flanged ring. In order to oppose the pressure of the fluid transported through the connecting device, the compression of the gasket or ring is essentially radial and, therefore, can only be produced by sliding over one of the rigid surfaces. Quite frequently, in a so-called "O-ring" coupling in which an O-ring is supported by the male terminal or element, the surface providing the seal must be of an appropriate nature to slide over the O-ring which is on a cylinder which surrounds the area of fluid flow. Such an O-ring device requiring a sliding action during coupling is disclosed in U.S. Pat. No. 4,193,616 (DANA CORP), although the patent is primarily directed to a locking coupling and not to the particular sealing zone disclosed therein.

In such prior art devices, the mechanical coupling between the male and female elements is often achieved either by means of a threaded coupling, by the engagement of levers which rock in a plane passing through the axis, or by other means, including semi-recoverable clamping. Examples of typical mechanical couplings are disclosed in French Pat. Nos. 2 558 563 and 2 585 443 (RASMUSSEN) or European Pat. No. 031 409 (ARMATURENFABRIK HERMANN VOSS).

Some of the devices disclosed in the patents mentioned hereinabove differ in the particular manner in which the flexible tube is fastened to one of the terminals. One discloses a vulcanized connection. Two other patents disclose devices which employ radial mechanical clamping, one of which is by expansion of an internal rod and the other of which is by external clamping.

Generally, the prior art devices do not include both a means for irreversibly fastening a flexible tube to a terminal and a means for providing a secure seal in a system which is simply to provide and easy to assembly.

With regard to a method and means of irreversibly fastening the flexible tube to the male terminal, the application of such a process is described in French Pat. No. 2 596 133. A device to connect a flexible pipeline to a rigid tube by means of a collar due to the contraction of an external polymer covering is disclosed therein, in which, in one embodiment, the terminal is effectively detachable, and can be used in the present invention.

There remains a need for any device which can be employed to improve the reliability and security of the type of seal produced by elastomer O-rings in the devices of the prior art. In such prior art devices, some of the O-rings must slide over a rigid surface, while being subjected, by means of a bevel, to a radial stress which is required to ensure the seal. Since, because of customary safety coefficients, the surface pressure exerted in operation at the contact surfaces of the joint is approximately three times the nominal pressure in the pipeline, the contact surfaces must be sufficiently smooth to allow non-destructive sliding at a relatively high pressure. The absence of fluid or lubricant during assembly very often results in the seals being non-reusable and can also lead to the destruction of the surfaces with which they come in contact.

OBJECTS OF THE INVENTION

It is an object of the present invention to provide a connecting device which is simple to provide, results in a reliable seal for an extended period of time, and substantially eliminates or reduces the disadvantages of the prior art.

It is another object to provide such a connecting device which employs a male coupling for being disposed, by axial movement, within a female coupling with a resilient O-ring being non-destructibly compressed between the exterior surface of the male coupling and the interior surface of the female coupling.

It is yet another object to provide such a connecting device in which the O-ring remains in non-sliding, rolling contact with the exterior surface and the interior surface during the axial movement of the male coupling within the female coupling.

SUMMARY OF THE INVENTION

In order to provide the preferred sealing function, the present invention includes various embodiments which employ at least one rolling, non-sliding O-ring. The preferred embodiments take advantage of the capability of an elastomer to withstand, for short periods of time, stresses which are much higher than those which occur during the sealing operation. For example, it has been found that compression values which are ten times the rated pressure within a pipeline can be easily exceeded during fitting or installing operations lasting less than one second. Since the non-sliding, rolling action of the O-ring can occur over any distance, another characteristic feature of the invention can include the progressive increase of the contact pressure on the O-ring. The converging of two walls having a small conical angle between them can preferably produce one complete turn (or several in some cases) of the elastomer O-ring on itself. As a result, the temporary heterogeneity of the stresses in the material of the O-ring, due to passage from a greater diameter to a lesser diameter or from the lesser diameter in the greater diameter, disappears in a fraction of a second, with a return to the original relaxed orientation of the O-ring. The resulting stresses in the relaxed orientation are then due essentially to the reduction of the available space between the converging walls which reduces the thickness of the O-ring to cause an ovalization of the cross section of the torus. A small reduction of the original diameter of the O-ring can also cause a slight and uniform variation of the stresses. Combining these three features, the invention, therefore, includes a coupling device including a male component and a female component with an O-ring disposed therebetween to provide sealing between the exterior surface of the male component and the interior surface of the female component. A flexible tube may be permanently fastened to a rigid portion of either the male component or the female component by means of a collar, which is, thermally contracted during cooling after being initially molded on an external portion of the tube. However, other means for connecting a flexible tube to a rigid portion of either the male or the female components could be alternatively employed.

The invention is further characterized by the fact that an elastomer O-ring, designed to provide the seal, is progressively compressed between two facing surfaces of the male and female components. Preferably, one of the facing surfaces is essentially cylindrical and the other of the facing surfaces is a small-angle cone. The progressive compression would preferably occur during relative axial movement of the male component within the female component to cause the non-sliding, rolling of the O-ring, as it preferably executes one or more complete turns on itself.

The objects of the invention are provided in a preferred embodiment thereof including a connecting device for sealing in flow of fluid therethrough. The connecting device includes a male coupling having an external surface and a female coupling having an internal surface. The male coupling and said female coupling are configured for being coaxially disposed with the male coupling at an initial position relative to said female coupling. The male coupling also is configured for being at least partially inserted in a sealed position relative within the female coupling by axial movement in a first direction from the initial position. A resilient O-ring means is configured for being disposed at a first position between the external surface of the male coupling and the internal surface of the female coupling when the male coupling is at the initial position. The O-ring is further configured for being disposed at a second position between the external surface of the male coupling and the internal surface of the female coupling when the male coupling is at the sealed position. The resilient O-ring is also configured for encircling the male component in both the first and the second positions. The O-ring at the second position is resiliently compressed between the external surface of the male coupling and the internal surface of the female coupling when the male coupling is at the sealed position to provide sealing to substantially prevent loss of the fluid by fluid flow between the external surface of the male coupling and the internal surface of the female coupling. The O-ring is configured for being rolled over on itself between the first position and the second position by the axial movement, in the first direction of the male coupling into the female coupling, by providing rolling friction between the O-ring and, each of, the external surface of the male coupling and the internal surface of the female coupling and without relative sliding movement between the O-ring and the external surface and without relative sliding movement between the O-ring and the internal surface.

BRIEF DESCRIPTION OF THE DRAWINGS

Various preferred and alternative embodiments of the invention are explained in detail below, with reference to the accompanying drawings.

DESCRIPTION OF THE PREFERRED EMBODIMENT

Figure 1A:
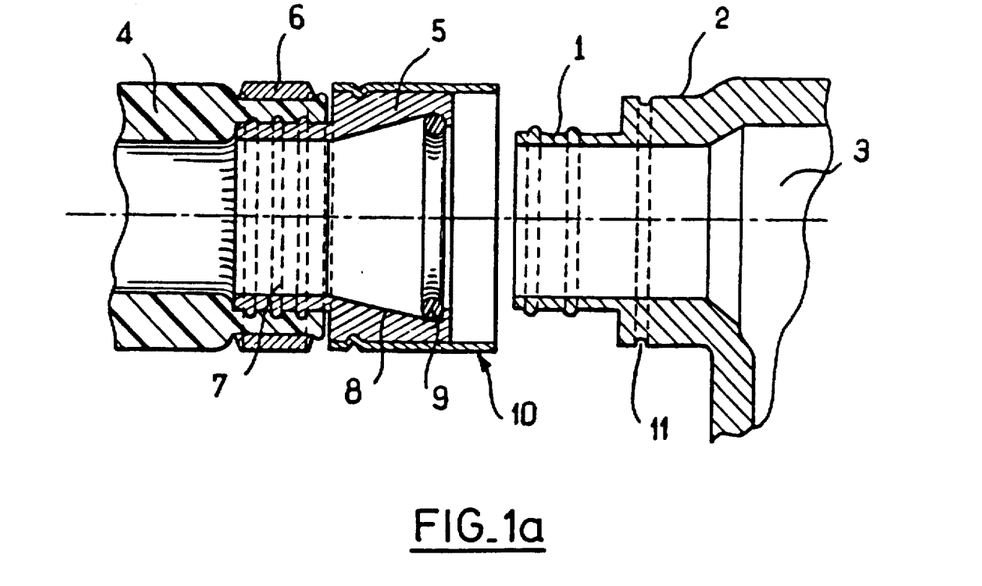
FIG. 1a is a sectional, elevational view of a preferred connecting device which has a female component including a conical interior surface and includes various features of the invention.
Figure 1B:
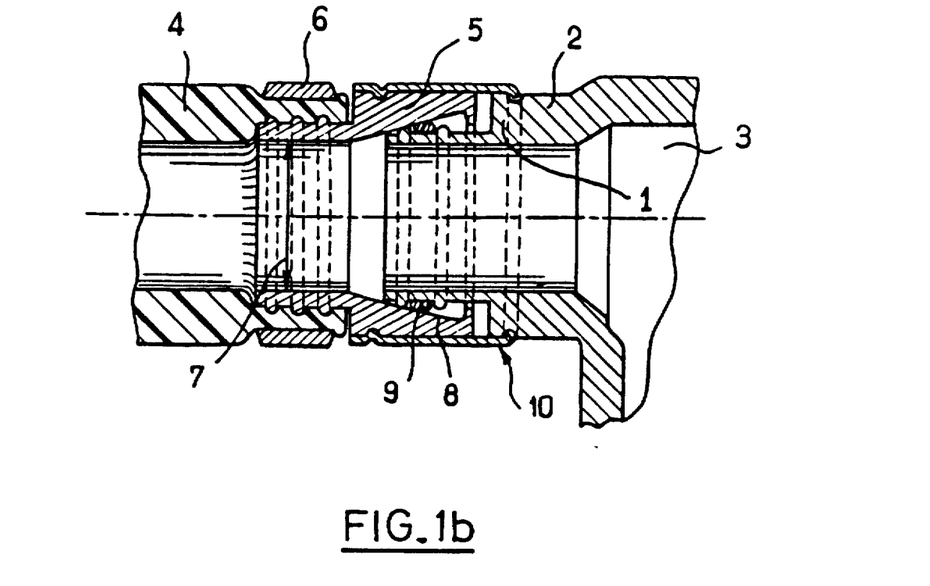
FIG. 1b is a sectional, elevational view of the preferred connecting device as seen in FIG. 1a after the coupling of the male and female components.

As seen in FIG. 1a and 1b, a preferred embodiment of the invention includes features which permit it to be used on many of the most common types of tube terminals or couplings. A preferred male component, of an embodiment of the invention, includes a tubular cylindrical component or part 1 of a type which can be used for the customary fitting of a flexible tube thereon. Such a flexible tube would frequently have the same inside diameter as the tubular component 1. The tubular component 1 is permanently connected to a collar 2 so that, in a customary fitting (not shown), the flexible tube would be force fitted over the tubular component to stop against the roller 2. In some embodiments of the invention, the tubular component 1 and its associated collar 2 can be an integral part of some other type of machine 3, such as a pump or radiator, as shown.

However, as seen in FIGS. 1a and 1b, the preferred connecting device includes a flexible tube 4, which is fastened to a female component 5. The preferred female component 5 includes a rigid portion which generally has the same inside diameter 7 as the flexible tube 4. The preferred connection between the tube 4 and the rigid portion is typically provided by the thermal contraction of a polymer, which is initially molded to form an external covering ring 6. This preferred connection process and its applications are described in French Pat. No. 2

596 133 (CAOUTCHOUC MANUFACTURE ET PLASTIQUES).

The preferred female component 5 has a funnel-shaped or conical part, extending beyond the inside diameter 7 of the rigid portion. The small-angle cone, which forms the internal conical surface 8 of the female component 5, has a slope along the axis of about one in ten, which for example, corresponds to an angle of about 6 degrees, from cylindrical, at the tip of the cone. An elastomer O-ring 9 is retained, at the base of the cone surface 8, by a low ridge, under a low compression, preferably at just the value necessary to keep it from falling out during handling operations. To permit molding and without requiring undercutting of the female component 5, the shoulder or ridge can advantageously be provided by plastic deformation of the end or base of the conical surface 8 after the installation of the elastomer O-ring 9 in the position as generally shown in FIG. 1a. In some embodiments of the invention, the ridge could be made by machining, taking into account the fact that the part, whether made of metal or reinforced plastic, might subsequently be subjected to the molding of the external ring 6 and the consequent manipulations and thermal stresses created in a mold process. Such a machining could provide the necessary finishing of the conical surface 8, which could be left unfinished for the preceding operation, and presented prior to the installation of the elastomer O-ring 9.

As seen in FIG. 1a, the preferred connecting device includes the male tubular component 1 and the female component 5 which are shown co-axially aligned prior to axial relative movement required for the coupling. The sizes of the O-ring, male component 1 and the female component 5 are selected so that, upon continued relative axial movement, the elastomer O-ring 9 substantially just fits on the conical surface 8 at the ridge and the leading cylindrical edge of the male component 1.

The preferred male component 1 includes a cylindrical external surface having external ring-shaped projections. Alternatively, the external surface may have a notched shape having at least one notch. The notch may preferably be in the form of a truncated cone which is tapered at a leading end, toward the direction of insertion to facilitate engagement with the O-ring 9. The notch preferably includes a sharp trailing edge tending to obviate detachment of the coupling, to resist the dislogement of the O-ring 9.

Generally, either type of projections would include a maximum height of about one-half the selected diameter for the cross section of the elastomer O-ring 9. At the beginning of the dynamic coupling or fitting operation, the elastomer O-ring would be pushed against the slope of the first projection and forced to roll, without any substantial sliding, between either of the two areas of contact, of the O-ring 9, with the internal conical surface 8 of the female component 5 and the external surface of the male component 1. Undesired sliding would not be possible in the preferred connecting device because of a proper selection of the materials used to provide the O-ring, the internal surface of the female component and the external surface of the male component and the proper selection of the angles therebetween. With a properly selected coefficient of friction between the O-ring and the internal surface, and between the O-ring and the external surface, and a sufficiently small angle between the converging internal and external surfaces, no substantial sliding would occur. Clearly, there would not generally, be any advantage to lubricating the contact surfaces at the time of assembly.

By way of example, the preferred connecting device could include the slope of the conical surface 8 of about 1/10, as discussed above, and the preferred thickness of the torus or O-ring is about 4 millimeters. With such preferred dimensions, one complete turn of the elastomer O-ring 9 would require a movement of approximately $\pi$ times the thickness, or approximately 12.6 mm, by the O-ring as it rolls along the internal surface 8 of the female component 5. At the same time, the elastomer O-ring 9 would also roll approximately 12.6 mm over the external surface of the male component 1. The rolling on the male component would include passing over the first projection and then returning to a stable position, as shown in FIG. 1b, on the generally cylindrical portion of the external surface of the male component 1. The axial relative movement of the male component 1 and the female component 5 is through a distance equal to the sum of the two distances, which is approximately 25.2 mm. At the same time it should be noted that, in the plane where the elastomer O-ring 9 is located, the outside diameter which surrounds the O-ring 9 has decreased by two times 1.26 mm, which is approximately 31% of the thickness of the O-ring, which has been dynamically compressed.

To be able to execute even a partial return movement, the elastomer O-ring 9 must undergo a temporary compression which is equal to about 50% of its thickness. Such a compression is possible, as in the approach or installation operation, under dynamic conditions where local stresses exceed 50 to 100 bars. With the O-ring 9 being positioned in a stable condition between the components 1, 5 and the components 1, 5 being retained in a fixed relative position axially, no additional locking of the O-ring 9 is necessary. FIG. 1a shows that an extended sleeve 10, which for example, consists of a metal tube, can be clamped or permanently fastened to the molding on the outside of the female component 5. After the components 1, 5 are brought closer together, as shown in FIG. 1b, an extended edge of the sleeve 10 is deformed to be disposed inside a groove 11 machined on the collar 2 of the male component 1, which is part of the housing of the machine 3. A second clamping function, provided by the engagement of the extended edge within the groove 11, tends to prevent any accidental detachment. It should be noted that the clamping in the form of local crimping can provide a back-up seal. Although the seal would probably be destroyed, for example, by drilling or cutting, the disassembly/reassembly operation of the components 1, 5 could be repeated as often as necessary, with or without replacement of the elastomer O-ring 9, which is subjected to a high fatigue stress during handling.

As seen in FIG. 1b, the front surface or edge of the female component 5 does not make contact with the enlarged edge of the collar 2. As a result, it would appear that the extended portion of the male component 1 could further extend inwardly within the interior of the female component 5. However, with the inclusion of an additional projection on the external surface of the male component 1, the elastomer O-ring 9 would be required to roll over the next projection. Since the outside diameter of the O-ring 9 is restricted by the conical internal surface of the female component 5, the amount of compression created on the O-ring 9 prevents continued rolling over to beyond the next projection on the external surface of the male component 1. It should also be noted that the dimension of the extended portion of the male component 1 is such that contact would be made with the conical internal surface of the female component 5, if the O-ring 9 were not present between the components 1, 5. As a result, the preferred embodiment includes the elastomer O-ring 9 which is sufficiently compressed so that further compression would be at a destructive value if the O-ring 9 were to be forced to proceed beyond the equilibrium position, as shown in FIG. 1b, with the O-ring 9 located between the two projections on the external surface of the male component 1.

It should be noted, although not shown in the preferred or any alternative embodiment, that the present invention could include a configuration in which the internal conical surface of the female component 5 terminates at about the same location as shown in FIG. 1b at which the O-ring 9 is fully compressed for proper sealing. With the conical surface terminating generally at the location of full compression of the O-ring 9, the interior of the female component 5 could continue with a cylindrical internal surface which has a larger diameter than the diameter of the cylindrical external surface of the male component 1. With such a configuration, the conical portion of the internal surface of the female component 5 could cause the O-ring 9 to roll as it is being compressed. However, continued insertion of the male component 1 within the female component 5 would allow continued rolling of the O-ring between the co-axially aligned internal cylindrical surface of the male component 1 and the internal cylindrical surface of the female component 5. In other words, with the O-ring 9 entrapped in a compressed state between co-axially aligned cylindrical surfaces, relative axial movement of the components 1, 5 could simply relocate the O-ring 9 therebetween at any particular axial location while still maintaining the O-ring 9 in proper compressed condition for sealing. Although such a configuration may not be preferred, it can be seen that the use of a leading conical surface or bevel which terminates at a cylindrical surface for the female component 5 could simplify some manufacturing tolerance requirements. In some such embodiments, the male component 1 could be further inserted into the female component 5 without there necessarily being an increase in the compressive forces on the O-ring 9 therebetween. Although the use of the co-axially aligned interior cylindrical surface and exterior cylindrical surface would seem to limit the specific amount of axial insertion of the male component 1 within the female component 5, any preferred embodiment of the present invention would generally require proper axial relative movement of the male component 1 with the female component 5 to allow the O-ring 9 to turn on itself along a sufficient distance which will enable the O-ring 9 to assume a sealed position in a generally relaxed orientation to prevent internal stresses which occur during the rolling over of the O-ring 9 on itself.

Figure 2A:
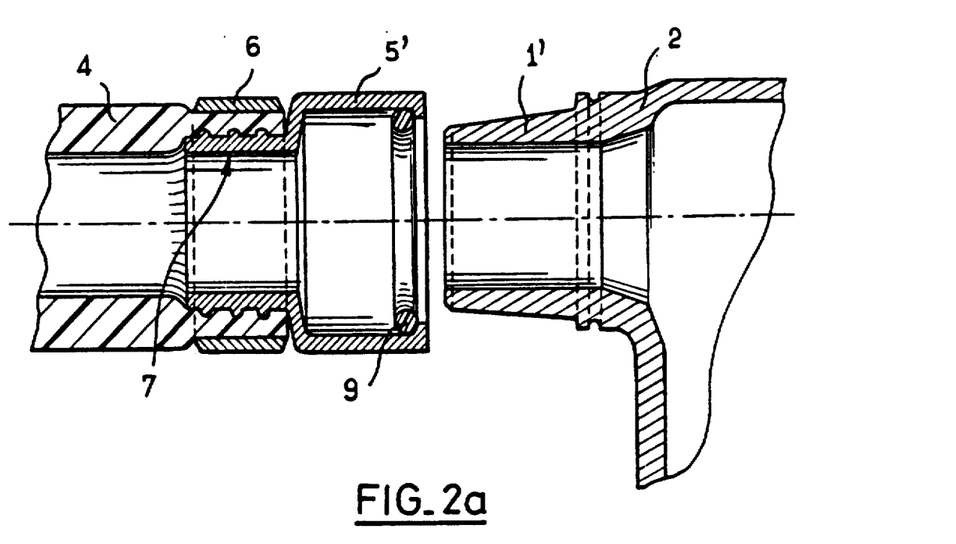
FIG. 2a is a sectional, elevational view of another preferred connecting device which includes a male component having a conical external surface.

As seen in FIG. 2a, an alternative connecting device includes a male component 1' and female component 5', which are in an uncoupled position similar to that shown for the embodiment of FIG. 1a. As seen in FIG. 2a, a flexible tube 4 is again mounted on the female component 5' with the coupling being preferably ensured by the thermal contraction of the polymer consisutituting the external coating ring 6. However, the female component 5' has an interior having a cylidrical surface which formed as an extension to include an interior diameter which is larger than the inside diameter 7, which essentially equal to that of the flexible tube 4.

An elastomer O-ring 9 is again realigned in an interior position by a ridge located at the end of the interior cylindrical surface of the female component 5'. The O-ring is again held in place by a slight compression applied during its installation against the ridge. As a result, one who uses the connecting device of FIG. 2a should ensure that the elastomer O-ring 9 remains in place until it starts rolling, simultaneously, between both contacting surfaces of the components 1' and 5'.

Figure 2B:
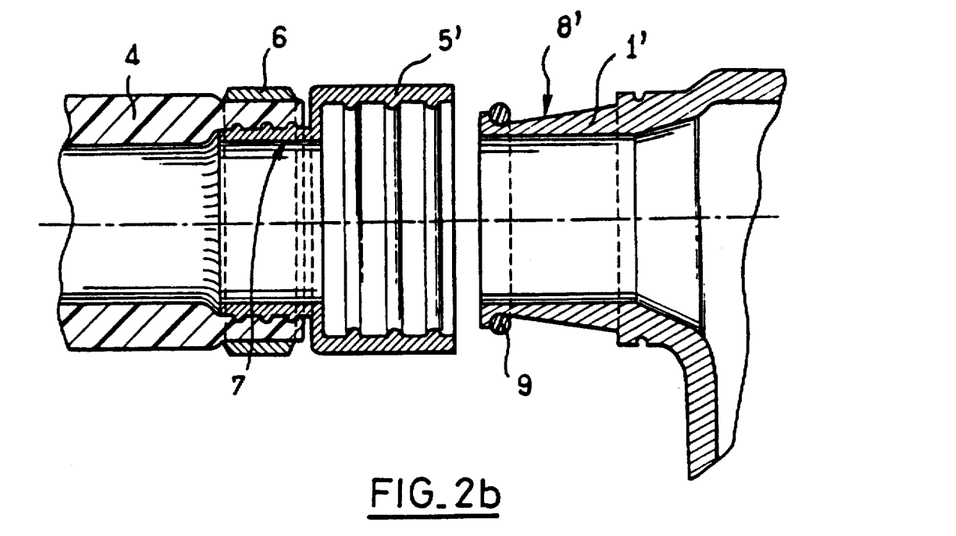
FIG. 2b is a sectional, elevational view of an alternative connecting device which includes a male component having a conical external surface.

As seen in FIGS. 2a and 2b, alternative embodiments of the present invention can include male components which include generally conical external surfaces which are for being mated with female components including generally cylindrical internal surfaces.

The fitting or coupling operation preferably compresses the elastomer O-ring 9 between the external conical surface 8' of the male component 1' and the internal, generally cylindrical surface of the female component 5'. Continued axial insertion again causes the O-ring 9 to turn over on itself, because the coefficients of friction of the materials in contact with one another prevents any significant sliding of the O-ring on either surface between which the O-ring is entrapped.

In the embodiment of FIG. 2a, the occurrences of one or two maximum reaction stress values, during the fitting, may only be due to the turning stresses of the elastomer O-ring 9, for example, if the Young's modules of the elastomer of the O-ring 9 is particularly high. The embodiment of FIG. 2a may preferably be used if the pressure of the fluid is low and the relative axial position of the male components 1' and female component 5' is maintained by other means. Additionally, this embodiment may be employed if the flexible tube is to be subjected to an underpressure, which could exist when used for suction hoods or for the transport of pulverized materials. In either case, it is expected that some type of mechanical locking mechanism (not shown) between the components 1', 5' would be used.

As shown in the embodiment of FIG. 2b, it should be recognized that it may be appropriate to increase the maximum reaction stress values on the O-ring as it rolls along the internal surface of the female component 5' by the inclusion of a series of inwardly extending projections on the internal cylindrical surface of the female component 5'. The projections may have a button or torus shape or the shape of truncated cones. Again, the male component 1' would include a small-angle conical external surface 8'. However, in the embodiment of FIG. 2b, the elastomer O-ring 9 would preferably be installed under slight tension on the end of the external conical surface of the male component 1'. A narrow ridge would again be employed at the end or edge of external conical surface 8' to prevent the O-ring 9 from being accidentally dislodged from the male component 1'.

After fitting and after coupling, the relative arrangement and relationship of the elements of FIGS. 2a and 2b do not significantly differ from the preferred embodiment shown in FIGS. 1a and 1b.

The embodiment of FIGS. 2a and 2b would preferably include a supplementary interlock system (not shown). The large reaction stresses, needed to oppose a return of the O-ring 9 to a uncoupled position, could be created by the high stresses to which the elastomer O-ring 9 would be subjected during a passage over any projections. The dimensions of these embodiments can be selected, for example, to include a torus having a very small diameter in relation to the diameters of the components 1', 5'. The torus diameter may be about 2.5 or 3 millimeters with the O-ring 9 having an inside diameter of about 32 millimeters. With such dimensions, the elastomer O-ring 9 of the embodiment of FIG. 2b could execute two turns on itself as it easily passes over the first projection to produce a basis seal. Continued passage over a second projection could require forces, which are significantly greater than the maximum thrust which could be exerted by the fluid at the rated circuit pressure, to guarantee a total seal.

Figure 3:
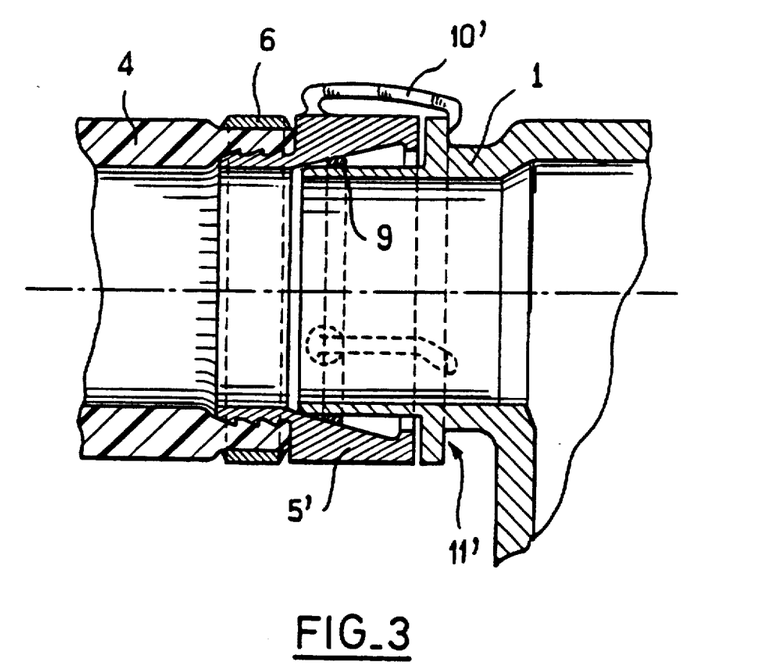
FIG. 3 is a sectional, elevational view of an alternative connecting device which includes a female component having a conical interior surface and employs an alternative locking device.

As seen in FIG. 3, another alternative embodiment could be used for automobile construction. In such an embodiment, the axial installation of the O-ring 9 can be automated, as long as its correct sealing position after the coupling can be verified. The embodiment of FIG. 3 is similar to that of FIG. 1b and includes a sealing operation of the elastomer O-ring 9 in which the O-ring 9 rolls over on itself one turn at a time. The male component 1' and female component 5' of FIG. 3 are subsequently locked, when the seal is established, by elastic hooks 10'. In a preferred arrangement, three of the hooks 10' are disposed in overlying contact against a collar 11' of the male component 1' in a manner which is generally known in the prior art. The hooks 10' are formed of resilient material and must be moved to an open position by the collar 11' during the coupling operation. Because of the biasing of the hooks 10', they will return to a locked position, as shown in FIG. 3, and close behind the collar 11'. Such movement can be easily detected by an automatic assembly device and, therefore, constitutes a guarantee of the proper operation of the seal.

The simultaneous opening of the hooks 10', which would be necessary to uncouple the device, would not tend to occur accidentally, because the required axial force, which is necessary for the retraction of the O-ring 9, is much higher than that required in the devices of the prior art.

The forces on the O-ring 9, due to the pressure of the fluid in the embodiment of FIG. 3, would tend to be balanced by the force of the elastic hooks 10'. The hooks 10' could be molded during the fabrication of the female component 5' from a basic industrial plastic material or, possibly, from a thermosetting material. It should be noted that the hooks 10' could also be subjected to a thermal and mechanical cycle which occurs during the molding of the external covering ring 6 and the subsequent cooling which ensures the clamping of the flexible tube 4 on the cylindrical portion of the female component 5'.

Figure 4:
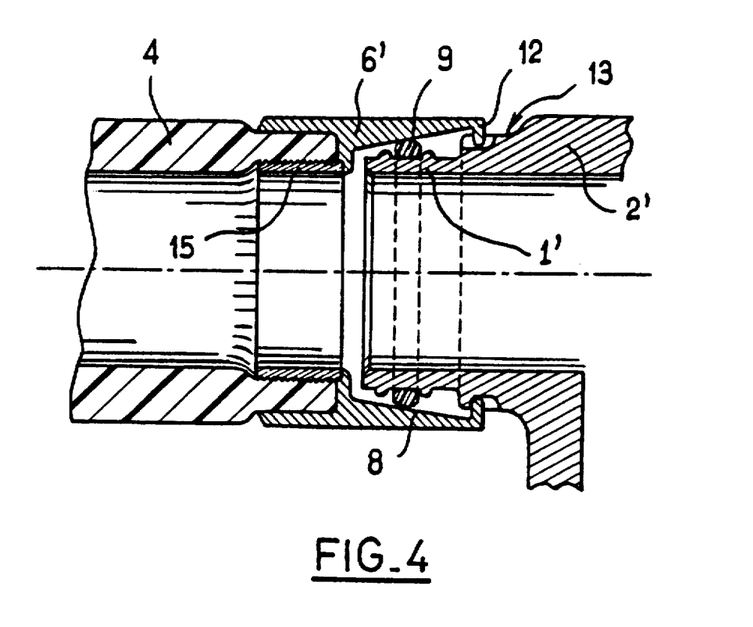
FIG. 4 is a sectional, elevational view of another alternative connecting device which includes the female component having a conical interior surface and employs another alternative locking device.

The alternative embodiment shown in FIG. 4 may be employed when the manufacturer can control the thermal deformations of the components in the fitting operation. The preferred female component 6' could include a rigid ring 15, e.g. a simple tubular metal section. The ring 15 could be permanently incorporated into the female component 6' which would also include, at the end thereof, an alternative form of a covering ring of the type discussed hereinabove. The molding of the female component 6' would indicate the covering ring being integrally formed with the other end having an internal conical surface 8. The process, discussed above, for the retraction of the tubular portion surrounding the flexible tube 4 insures that the collar portion will hold and secure the tube 5. However, the process must be carefully controlled during the molding in order to properly provide the desired shape of internal conical surface 8.

The basic male component 1' would have the same general features as the male component 1 of FIG. 1. However, the component 1' would include a bayonet locking device disposed by the grooves 13 in the collar 2'. A plurality of lugs 12, which are located at the end of the female component 6' and the conical surface 8, would be adapted to engage the grooves 13. The lugs 12, e.g. four of them, would require less precision, because of the deformations during cooling of the material surrounding the flexible tube 4, while still being able to properly function in a bayonet device.

The operation of installing such a bayonet device produces the maximum security and reliability if, when the elastomer O-ring 9 is placed in contact with the conical surface cone 8, the lugs 12 are aligned with the locked position in the grooves 13. The initial engagement in this manner will result in rolling contact which must be executed with a twisting movement. The deformability of the elastomer O-ring 9 allows the shearing stress produced during continued twisting and rolling engagement to be followed by a rotation or reverse twisting, ensuring the locking, at the end of travel. As a result, in the locked position, the circumferential elastic stresses exerted on the elastomer O-ring 9 return to an equilibrium condition. If the engagement were to be attempted in a linear fashion, with the lugs 12 aligned with the open position of the grooves 13, after locking, the circumferential elastic stresses on the elastomer O-ring 9 would produce an elastic recall tending to open the device. As a result, the preferred locking can be as dynamic as necessary and would require unlocking forces which would significantly exceed any accidental forces or stresses which might occur during service. An additional sealing, crimping or spot welding of the preferred locking device, however, could be employed for safety reasons and would provide some indication of an attempt having been made to disassemble the connecting device.

Figure 5:
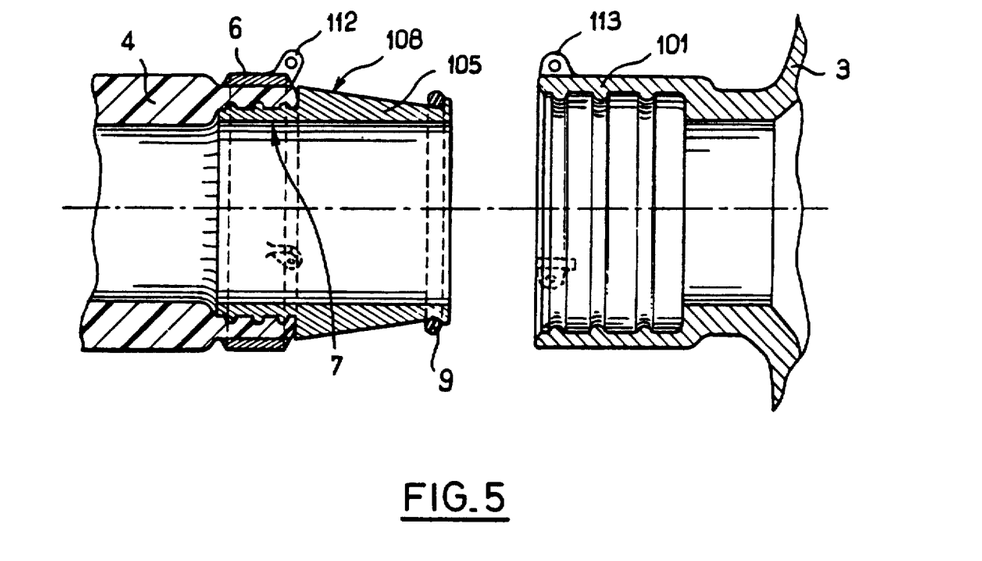
FIG. 5 is a sectional, elevational view of a connecting device similar to that shown in FIG. 2b including another alternative locking device.

As seen in FIG. 5, yet another alternative embodiment includes a male component 105 and a female component 101 which function in a reserve manner from the embodiment shown in FIG. 2b. In this embodiment, the flexible tube 4 is permanently fastened by the attachment of an external ring 6, to the male element 105, which has the same inside diameter 7 as that of the flexible tube 4. The male component 105 has a an external conical surface 108, which terminates at a ridge at one end thereof. The flexible tube 4 stops at the other end of the surface 108 before assembly. The elastomer O-ring 9 is installed under slight tension on the exposed end of the rigid element 105 and against the narrow ridge which prevents the O-ring 9 from falling out during handling operations.

The terminal 101, which is permanently fastened to a machine 3, such as a pump or radiator, has an essentially cylindrical internal surface, which may or may not be provided with projections, buttons or hooks to provide a discontinuity in the compression of the elastomer O-ring 9 during the axial coupling maneuver. A number of features of this embodiment of FIG. 5 are identical to those previously described. However, for locking in the sealed position, a dimple 112 is provided on the external ring 6 for alignment with a similar dimple 113 on the female component 101. The dimples 112,113 may be secured by welding, if the components are metal, or by molding, if the components are made of a reinforced plastic. One, two or three of such dimples 112 and 113 may each have a hole extending therethrough for the passage of a sealing wire, a bolt or rivet, or any other such system which will give evidence of an attempt to detach the connection.

Figure 6:
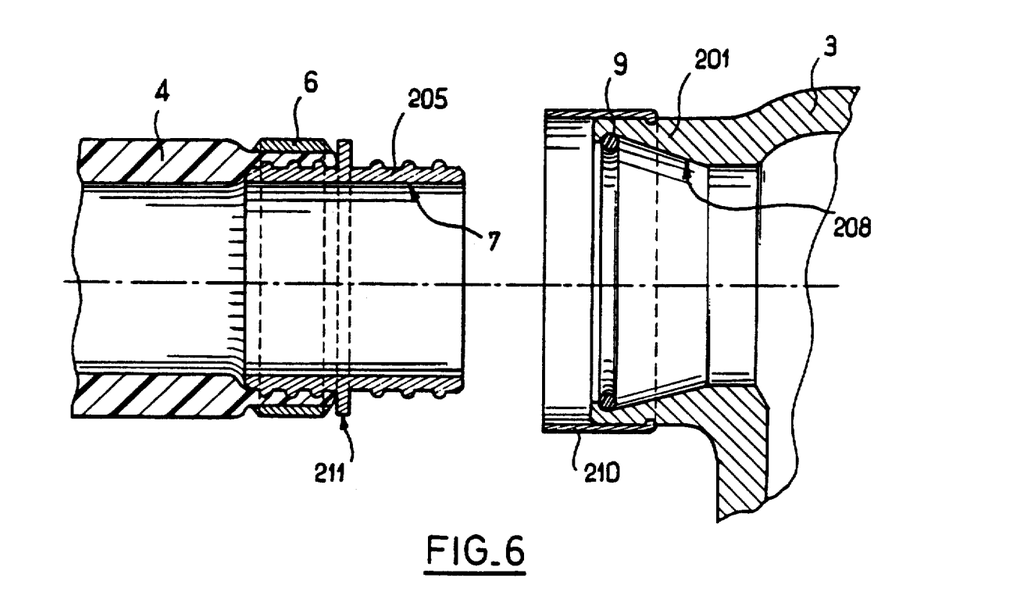
FIG. 6 is a sectional, elevational view of a connecting device similar to that shown in FIGS. 1a and 1b but including additional, alternative features of the invention.

Still another alternative embodiment is shown in FIG. 6 which performs the same functions, with a reversed relationship, as the embodiment of FIG. 1a. The flexible tube 4 is again permanently mounted by the attachment of an external ring 6, on a rigid end of a male component 205, which has the same inside diameter 7 as that of the flexible tube 4. The male component 205 again has an essentially cylindrical external surface, on which are shown projections, buttons or hooks for the contact surface of the elastomer O-ring 9. The projections, buttons or hooks can be identical to or different from those employed for the installation of the ring 6 for retaining the flexible tube 4. A collar 211, which may or may not be permanently fastened to the male component 205, serves as a stop for the flexible tube 4 during preliminary assembly.

The female component 201, permanently fastened to the machine 3, again includes an internal conical surface 208. The elastomer O-ring 9 is again installed under slight compression, at the end of the surface 208, by means of a narrow ridge which prevents it from falling out during handling operations. The ridge can, again, be produced by machining or by plastic deformation after installation of the O-ring 9. The embodiment of FIG. 6 includes a locking sleeve 210 intended to hold the assembly, by partial or complete clamping over the collar 211 of the male component 205, which the sleeve 210 overlaps after assembly.

In order to guarantee the seal, after the complete rolling or turning of the elastomer O-ring 9, it is not necessary for the female component 201 to stop against the collar 211. All that is necessary is the use of some form of locking means which prevents the separation of these two elements from the sealed position.

It should be clear to those skilled in the art that the term "essentially cylindrical" used to designate a surface, which may or may not have projections, buttons or hooks, can be used as long as the average surface of this component is a cone having an angle between zero and eight degrees. Likewise, the terms "small-angle cone", internal conical surface, and external conical surface, are used for a surface which would form a part of a cone having an angle at the tip or point thereof, which angle is between four and fifteen degrees. It has been found that, for some of the preferred embodiments, the most significant relationship exists when there is an angular difference between the internal and external surfaces, which is approximately six degrees and which allows the progressive compression of the O-ring during the axial approach of the two components.

In summary, the different embodiments of the connecting device, which is the object of the invention, can be considered separately or as combinations of their component parts. The various embodiments make it possible to exert significant forces on a gasket, without any particular requirements for or limitations regarding the surface condition of the facing surfaces. The geometric precision and resulting manufacturing tolerances required to provide the embodiments of the invention are frequently less severe than those required by previous processes and, therefore would allow the use of more economical fabrication methods. Interchangeability, as well as automation of the assembly, are thereby encouraged, since the O-ring is commercially available.

Those skilled in the art, of course, could make various modifications to the connecting device, which is the object of the invention, to the particular features described herein by way of non-restricting examples, or to the combination of their components, without going beyond the scope of the invention as claimed. For example, although all of the preferred embodiments discussed hereinabove include conical or cylindrical surfaces, the surfaces of one or more of the pieces may alternatively be formed of a section of a paraboloid or a hyperboloid or may have a number of irregularities or regularities having various dimensions for changing the diametrical dimensions of the componence while still effectively converging the surfaces to provide the desired compression of the O-rings. In other words, a portion of the internal surface of the female component and a portion of the external surface of the male component may converge through curved or straight portions as long as the resulting convergents causes a rolling of the O-ring without significant sliding between the O-ring and either of the internal or external surfaces. It should also be clear, for example, that the male and female component may not necessarily be circular in cross-section but could even be in an elliptical form. Still further, it should be clear that, as mentioned with respect to the embodiment shown in FIGS. 1a and 1b, a major portion of the internal surface and the external surface could be co-axially aligned cylindrical surfaces which include a spacing therebetween for maintaining the O-ring in a compressed condition. Further axial movement of such a male component within such a female component would simply allow continued rolling of the O-ring on itself until properly positioned for sealing.

All, or substantially all, of the components and methods of the various embodiments may be used with at least one embodiment or all of the embodiments, if any, described herein.

All of the patents, patent applications, and publications recited herein are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A connecting device for sealing in flow of fluid therethrough, said connecting device comprising;
   a male coupling having an external surface;
   a female coupling having an internal surface;
   said male coupling and said female coupling being configured for being coaxially disposed with said male coupling at an initial position relative to said female coupling;
   said male coupling also being configured for being at least partially inserted in a sealed position relative within said female coupling by axial movement in a first direction from said initial position;
   resilient O-ring means;
   said resilient O-ring means being configured for being disposed at a first position between said external surface of said male coupling and said internal surface of said female coupling when said male coupling is at said initial position;

said O-ring means further being configured for being disposed at a second position between said external surface of said male coupling and said internal surface of said female coupling when said male coupling is at said sealed position;

said resilient O-ring means also being configured for encircling said male coupling in both said first and said second positions;

said O-ring means at said second position being resiliently compressed between said external surface of said male coupling and said internal surface of said female coupling when said male coupling is at said sealed position to provide sealing to substantially prevent loss of the fluid by fluid flow between said external surface of said male coupling and said internal surface of said female coupling;

said O-ring means being configured for being rolled over on itself between said first position and said second position by said axial movement, in said first direction of said male coupling into said female coupling, by providing rolling friction between said O-ring means and, each of, said external surface of said male coupling and said internal surface of said female coupling and without relative sliding movement between said O-ring means and said external surface and without relative sliding movement between said O-ring means and said internal surface;

wherein at least one of said external surface of said male coupling and said internal surface of said female coupling has a substantially conical surface portion that defines a conically shaped portion;

wherein said conically shaped portion of said at least one of said external surface of said male coupling and said internal surface of said female coupling converges toward the other of said external surface of said male coupling and said internal surface of said female coupling during said axial movement;

wherein in the converging of said conically shaped portion toward the other surface is for applying an increasing contact force on said O-ring means when said O-ring means moves from said first position to said second position;

said converging of said conically shaped portion toward the other surface being for decreasing the distance between the surfaces adjacent said O-ring means during said axial movement in said first direction;

said converging of said conically shaped portion toward the other surface is for applying an increasing contact force on said O-ring means, said contact force for causing said O-ring means to stop at said second position when said axial movement is completed;

wherein the separation between said first position and said second position is equal to the distance said O-ring means moves when it completes at least one complete integral rollover turn on itself;

said converging of said conically shaped portion toward the other surface and the uncompressed diameter of said O-ring means being configured such that said O-ring means is in a substantially internally relaxed stress orientation, which stress results from said O-ring rolling over on itself, when at said first position and said second position;

said converging of said conically shaped portion toward the other surface and said uncompressed diameter of said O-ring means being configured such that said O-ring means is out of said relaxed orientation when out of either of said first position and said second position and has not rolled over an integral number of rollover turns on itself;

said converging of said conically shaped portion toward the other surface and said distance said O-ring moves from said first position to said second position being configured such that said O-ring means completes at least one complete rollover turn on itself when moved from said first position to said second position; and said converging of said conically shaped portion toward the other surface and said uncompressed diameter of said O-ring means being configured such that said O-ring means has internal stresses that are substantially smaller when said O-ring means is in said relaxed orientation than when said O-ring means is out of said relaxed orientation.

2. The connecting device according to claim 1, wherein said converging surfaces cooperate during said axial movement in said first direction to progressively increase a compressive force on said O-ring means as said O-ring means is rolled from said first position to said second position.

3. The connecting device according to claim 1, wherein at least one of said external surface and said internal surface includes a substantially cylindrical surface portion.

4. The connecting device according to claim 3, wherein a first of said internal surface and said external surface includes said substantially cylindrical surface portion.

5. The connecting device according to claim 4, wherein said substantially conical surface portion is defined as a portion of a virtual cone, said cone converges in said first direction to a tip of said cone, said tip has a predetermined angle, and said predetermined angle is between about four degrees and about fifteen degrees.

6. The connecting device according to claim 5, further including means for maintaining said O-ring means in an uncoupled position against said substantially cylindrical surface portion prior to said male coupling being disposed at said initial position relative to said female coupling.

7. The connecting device according to claim 5, wherein said internal surface of said female coupling includes said conical surface portion and said external surface of said male coupling includes said cylindrical surface portion;

wherein said cylindrical surface portion of said male coupling includes at least one circumferential projection means and said O-ring means at said second position is disposed against one of said at least one projection means for causing said O-ring means to roll over said one of said at least one projection means during said axial movement in said first direction.

8. The connecting device according to claim 7, wherein said internal surface of said female coupling includes at least one circumferential projection means and said O-ring means at said second position is disposed against one of said at least one projection means for causing said O-ring means to roll over said one projection means during said axial movement in said first direction.

9. The connecting device according to claim 5, wherein said internal surface of said female coupling includes said cylindrical surface portion and said external surface of said male coupling includes said conical surface portion.

10. The connecting device according to claim 5, further including means for maintaining said O-ring means in an uncoupled position against said substantially conical surface portion prior to said male coupling being disposed at said initial position relative to said female coupling.

11. The connecting device according to claim 10, wherein said means for retaining said O-ring means includes said conical surface portion having an end at which said O-ring means is disposed at said first position, said end of said conical surface terminates at a ridge and is substantially contiguous with said ridge, said O-ring means is in contact with said ridge and said conical surface portion at said end, said O-ring means being configured to have internal biasing, said O-ring means at said uncoupled position is deflected against said internal biasing to establish said contact with said ridge and said conical surface portion at said end in said uncoupled position.

12. The connecting device according to claim 11, wherein said internal surface of said female coupling includes said conical surface portion, said end of said conical surface portion is away from said tip of said cone, said ridge extends outwardly from said conical surface portion of said female coupling and said O-ring means is installed under slight compression against said internal biasing in said uncoupled position.

13. The connecting device according to claim 11, wherein said external surface of said male coupling includes said conical surface portion, said end of said conical surface portion is toward said tip of said cone, said ridge extends outwardly from said conical surface portion of said male coupling and said O-ring means is installed under slight tension against said internal biasing in said uncoupled position.

14. The connecting device according to claim 1, further including means for removably securing said male coupling within said female coupling in said sealed position;
wherein said means for retaining includes sleeve means at least partially encircling said female coupling and said male coupling, said sleeve means having a first end and a second end, said first end being secured to said female coupling and said second end being secured to said male coupling.

15. The connecting device according to claim 14, wherein said means for retaining includes hook means mounted on one of said female coupling and said male coupling, said hook means has an extended end away from said one of said female coupling and said male coupling, radial surface means on the other of said female coupling and said male coupling than said one of said female coupling and said male coupling on which said hook means is mounted, and said extended end of said hook means overlies and engages said radial surface means when said male coupling is in said sealed position.

16. The connecting device according to claim 15, wherein said hook means and said radial surface means are configured as a bayonet locking means, said bayonet locking means for preventing elastic recall tending to separate said male coupling from said female coupling through a reverse rotational effect, said locking of said bayonet locking means being produced by a reaction of shear stresses due to a twisting movement during rolling movement of said O-ring means.

* * * * *

UNITED STATES PATENT AND TRADEMARK OFFICE
CERTIFICATE OF CORRECTION

PATENT NO. : 4,993,756

DATED : February 19, 1991

INVENTOR(S) : Jean-Pierre BECHU

It is certified that error appears in the above-identified patent and that said Letters Patent is hereby corrected as shown below:

In column 7, lines 65-66, after 'polymer', delete "consistituting" and insert --constituting--.

Signed and Sealed this

Twenty-second Day of September, 1992

Attest:

DOUGLAS B. COMER

*Attesting Officer*      *Acting Commissioner of Patents and Trademarks*